US010459528B2

(12) United States Patent
Yildiz et al.

(10) Patent No.: US 10,459,528 B2
(45) Date of Patent: Oct. 29, 2019

(54) INFORMATION HANDLING SYSTEM ENHANCED GESTURE MANAGEMENT, CONTROL AND DETECTION

(71) Applicant: Dell Products L.P., Round Rock, TX (US)

(72) Inventors: Yagiz C. Yildiz, Austin, TX (US); Rex W. Bryan, Round Rock, TX (US); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/907,558

(22) Filed: Feb. 28, 2018

(65) Prior Publication Data

US 2019/0265801 A1 Aug. 29, 2019

(51) Int. Cl.
*G06F 3/01* (2006.01)
*G06F 3/0484* (2013.01)

(52) U.S. Cl.
CPC .......... *G06F 3/017* (2013.01); *G06F 3/04847* (2013.01)

(58) Field of Classification Search
None
See application file for complete search history.

(56) References Cited

U.S. PATENT DOCUMENTS

| 6,134,661 | A  | 10/2000 | Topp |
| 6,297,804 | B1 | 10/2001 | Kashitani |
| 6,504,530 | B1 | 1/2003  | Wilson et al. |
| 6,614,422 | B1 | 9/2003  | Rafii et al. |
| 7,252,394 | B1 | 8/2007  | Fu |
| 7,692,667 | B2 | 4/2010  | Nguyen et al. |
| 8,228,315 | B1 | 7/2012  | Starner et al. |
| 8,321,810 | B2 | 11/2012 | Henitze |
| 8,531,352 | B2 | 9/2013  | Zeng et al. |
| 8,958,158 | B1 | 2/2015  | Raffle et al. |
| 9,348,420 | B2 | 5/2016  | Krishnakumar et al. |
| 9,690,400 | B2 | 6/2017  | Krishnakumar et al. |
| 9,958,959 | B2 | 5/2018  | Dietz |
| 2002/0075240 | A1 | 6/2002 | Lieberman et al. |

(Continued)

FOREIGN PATENT DOCUMENTS

WO WO 2016155887 10/2016

OTHER PUBLICATIONS

Celluon, Magic Cube, printed Aug. 24, 2015 http://www.celluon.com/products_epic_overview.php.

(Continued)

*Primary Examiner* — Kent W Chang
*Assistant Examiner* — Benjamin Morales
(74) *Attorney, Agent, or Firm* — Zagorin Cave LLP; Robert W. Holland

(57) ABSTRACT

Gesture inputs at an information handling system adapt to manage end user resolution constraints by selectively assigning a physical input device to accept fractional inputs of the gesture type. For example, an end user maintains a gesture for a predetermined time to command a totem device to adapt from a first type of input, such as scrolling, to the gesture input so that the end user may more precisely manage the desired gesture input through the totem. Upon movement from the gesture, the physical input device reverts from the gesture input to the first type of input.

18 Claims, 3 Drawing Sheets

(56) References Cited

U.S. PATENT DOCUMENTS

| | | |
|---|---|---|
| 2003/0126317 A1 | 7/2003 | Chang |
| 2003/0132921 A1 | 7/2003 | Torunoglu et al. |
| 2004/0049462 A1 | 3/2004 | Wang |
| 2004/0100479 A1 | 5/2004 | Nakano et al. |
| 2004/0267995 A1 | 12/2004 | Peng |
| 2005/0024606 A1 | 2/2005 | Li et al. |
| 2005/0141752 A1 | 6/2005 | Bjorgan et al. |
| 2005/0225538 A1 | 10/2005 | Verhaegh |
| 2005/0254453 A1 | 11/2005 | Barneah |
| 2005/0264987 A1 | 12/2005 | Krancher et al. |
| 2005/0281475 A1 | 12/2005 | Wilson |
| 2006/0092170 A1 | 5/2006 | Bathiche et al. |
| 2006/0139714 A1 | 6/2006 | Gruhike et al. |
| 2006/0244719 A1 | 11/2006 | Brigham |
| 2006/0256090 A1 | 11/2006 | Huppi |
| 2007/0035521 A1 | 2/2007 | Jui et al. |
| 2007/0058879 A1 | 3/2007 | Cutler et al. |
| 2007/0270213 A1 | 11/2007 | Nguyen et al. |
| 2008/0231611 A1 | 9/2008 | Bathiche et al. |
| 2008/0238879 A1 | 10/2008 | Jaeger |
| 2009/0077504 A1 | 3/2009 | Bell et al. |
| 2009/0168027 A1 | 7/2009 | Dunn et al. |
| 2009/0184962 A1 | 7/2009 | Kuriakose et al. |
| 2009/0249339 A1 | 10/2009 | Larsson et al. |
| 2009/0278871 A1 | 11/2009 | Lewis |
| 2009/0295712 A1 | 12/2009 | Ritzau |
| 2010/0053110 A1 | 3/2010 | Carpenter et al. |
| 2010/0079369 A1 | 4/2010 | Hartmann et al. |
| 2010/0194677 A1* | 8/2010 | Fiebrink ............ G06F 3/04847 345/156 |
| 2010/0250801 A1 | 9/2010 | Sangster et al. |
| 2010/0328200 A1 | 12/2010 | Yu |
| 2011/0012727 A1 | 1/2011 | Pance et al. |
| 2011/0157056 A1 | 6/2011 | Karpfinger |
| 2011/0181523 A1 | 7/2011 | Grothe et al. |
| 2011/0304580 A1 | 12/2011 | Wu et al. |
| 2012/0035934 A1 | 2/2012 | Cunningham |
| 2012/0050314 A1 | 3/2012 | Wang |
| 2012/0089348 A1 | 4/2012 | Perlin |
| 2012/0166993 A1 | 6/2012 | Anderson et al. |
| 2012/0169598 A1 | 7/2012 | Grossman et al. |
| 2012/0176311 A1 | 7/2012 | Bittenson |
| 2012/0194457 A1 | 8/2012 | Cannon |
| 2012/0235909 A1 | 9/2012 | Birkenbach |
| 2012/0272179 A1 | 10/2012 | Stafford |
| 2012/0306767 A1 | 12/2012 | Campbell |
| 2012/0313858 A1 | 12/2012 | Park et al. |
| 2013/0050124 A1* | 2/2013 | Helot ................. B60K 37/06 345/173 |
| 2013/0082928 A1 | 4/2013 | Kim et al. |
| 2013/0111391 A1 | 5/2013 | Penner et al. |
| 2013/0132885 A1 | 5/2013 | Maynard et al. |
| 2013/0285901 A1 | 10/2013 | Lee et al. |
| 2014/0043289 A1 | 2/2014 | Stern |
| 2014/0051484 A1 | 2/2014 | Hunt et al. |
| 2014/0168083 A1 | 6/2014 | Ellard |
| 2014/0168132 A1 | 6/2014 | Graig |
| 2014/0327628 A1 | 6/2014 | Tijssen |
| 2014/0191927 A1 | 7/2014 | Choi |
| 2014/0195933 A1 | 7/2014 | Rao |
| 2014/0204127 A1 | 7/2014 | Tann et al. |
| 2014/0210748 A1 | 7/2014 | Narita |
| 2014/0267866 A1 | 9/2014 | Short et al. |
| 2015/0039317 A1 | 2/2015 | Klein et al. |
| 2015/0097803 A1 | 4/2015 | Leigh et al. |
| 2015/0098182 A1 | 4/2015 | Liu et al. |
| 2015/0131913 A1 | 5/2015 | Anderson et al. |
| 2015/0169080 A1* | 6/2015 | Choi ..................... G06F 3/041 345/174 |
| 2015/0169531 A1 | 6/2015 | Campbell |
| 2015/0248235 A1 | 9/2015 | Offenberg |
| 2015/0250021 A1 | 9/2015 | Stice et al. |
| 2015/0268773 A1* | 9/2015 | Sanaullah ............ H04N 9/3179 345/168 |
| 2015/0379964 A1 | 12/2015 | Lee et al. |
| 2016/0054905 A1 | 2/2016 | Chai et al. |
| 2016/0063762 A1 | 3/2016 | Heuvel et al. |
| 2016/0085358 A1 | 3/2016 | Palanisamy |
| 2016/0091990 A1 | 3/2016 | Park |
| 2016/0126779 A1 | 5/2016 | Park |
| 2016/0179245 A1 | 6/2016 | Johansson et al. |
| 2016/0239145 A1* | 8/2016 | Chang .................. G06F 3/0416 |
| 2016/0294973 A1 | 10/2016 | Bakshi et al. |
| 2016/0316186 A1 | 10/2016 | Krishnakumar |
| 2016/0349926 A1 | 12/2016 | Okumura |
| 2016/0378258 A1 | 12/2016 | Lyons et al. |
| 2017/0269722 A1 | 9/2017 | Krishnakumar et al. |
| 2018/0074639 A1* | 3/2018 | Powell ..................... G06F 3/044 |
| 2018/0088792 A1* | 3/2018 | Klein ................... G06F 3/04883 |
| 2018/0129335 A1 | 5/2018 | Stone |
| 2018/0129336 A1 | 5/2018 | Files |
| 2018/0129337 A1 | 5/2018 | Stone |
| 2018/0129347 A1 | 5/2018 | Files |
| 2018/0129348 A1 | 5/2018 | Files |
| 2018/0314416 A1 | 11/2018 | Powderly |
| 2018/0373350 A1* | 12/2018 | Rao ........................ B60K 35/00 |
| 2019/0012003 A1* | 1/2019 | Grant .................... G06F 3/0362 |

OTHER PUBLICATIONS

Harrison, C., OmniTouch: "Wearable Multitouch Interaction Everywhere," Oct. 2011, http://chrisharrison.net/projects/omnitouch/omnitouch.pdf.

Ibar, Intelligent Surface System, printed Aug. 24, 2015 http://www.i-bar.ch/.

Indiegogo, E-inkey Dynamic Keyboard, printed Sep. 9, 2015 http://www.indiegogo.com/projects/e-inkey-dynamic-keyboard.

Leap Motion, Mac & PC Motion Controller for Games, Design, Virtual Reality & More, printed Aug. 24, 2015 https://www.leapmotion.com/.

Mistry et al., WUW—Wear UR World: A Wearable Gestural Interface, Apr. 4-9, 2009, Proceeding CHI '09 Extended Abstracts on Human Factors in Computing Systems, pp. 4111-4116.

razerzone.com, Razer Blade Pro, printed Aug. 24, 2015, http://www.razerzone.com/gaming-systems/razer-blade-pro.

Schmalstieg et al., Bridging Multiple User Interface Dimensions with Augmented Reality, Oct. 6, 2000, 2000 (ISAR 2000), Proceedings. IEEE and ACM International Symposium on Augmented Reality, pp. 20-29.

Sine Walker, MS-Windows focus-follows-mouse Registry hacks, Mar. 10, 2010, wordpress.com, https://sinewalker.wordpress.com/2010/03/10/ms-windows-focus-follows-mouse-registry-hacks/, pp. 1-2.

Smith, M., Alienware M17X R4 Review, Jun. 21, 2012, http://www.digitaltrends.com/laptop-reviews/alienware-m17x-r4-review/.

Sternon, J., Intel Nikiski Laptop Prototype with See-Through Touchpad Hands-On Pictures and Video, Jan. 9, 2012, http://www.theverge.com/2012/1/9/2694171/Intel-Nikiski-hands-on-pictures-video.

Sun Innovations, Expanded Heads-Up Display (E-HUD), printed Aug. 24, 2015 http://www.sun-innovations.com/index.php/products/fw-hud.

UBI, Sensor, printed Aug. 24, 2015, http://www.ubi-interactive.com/product#UbiSensor.

* cited by examiner

INFORMATION HANDLING SYSTEM ENHANCED GESTURE MANAGEMENT, CONTROL AND DETECTION

BACKGROUND OF THE INVENTION

Field of the Invention

The present invention relates in general to the field of information handling system inputs, and more particularly to an information handling system enhanced gesture management, control and detection.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems generally receive inputs from end users through a variety of input/output (I/O) devices. For example, typical information handling systems interface with a keyboard to accept keyed inputs and a mouse to accept point-and-click inputs. In addition to these basic I/O devices, end users often interact with an information handling system through touch devices, such as a touchscreen display or a touchpad. In a touch environment, totems are tools that act as an intermediary between the end user and the touchscreen to aid in making inputs. One example of a totem is a pen that writes on a touchscreen, thus providing a more precise contact location than an end user finger. Another example of a totem is a rotating disc that rests on a touchscreen and rotates to provide a dial input device. A rotating disc may, for instance, change the volume of speakers based on rotational position, which translates as touches to a touchscreen display. Alternatively, a totem may detect rotational positions internally and report positions by Bluetooth or other communication mediums.

When interacting with touch devices, end users can input information in the form of gestures. Generally, gestures are moving touches with one or more fingers that have a defined pattern associated with a defined input. For example, a common gesture is a pinching of two fingers towards each other to indicate zoom in and pinching of two fingers away from each other to indicate zoom out. In some instances, applications define gestures, such as a rotational movement in a computer assisted design (CAD) application which indicates rotation of the orientation of a displayed model. More recently, end users can make gestures as inputs without relying upon a touch device to detect the gestures. For example, a depth camera and/or ultrasonic sensor detects end user motions in space and apply the motions as gestures to data presented on a display. Thus, a pinching motion of fingers is detected by the depth camera rather than the touchscreen and then applied to an image presented on the touchscreen. In particular, gestures provide an intuitive input for virtual objects presented by a head mounted display. The end user is able to reach out towards and manipulate the virtual object as if the end user is manipulating a real object. The end user gestures are captured and applied as inputs to the model that generated the virtual object.

Although gestures provide an intuitive input interface with an information handling system, gestures generally lack the precision of more concrete input devices, such as a keyboard or mouse. For example, resolution of gestures that involve action or movements tends to be low and fixed in nature. For instance, a pinch to zoom typically changes scale from 100 to 200% zoom without providing an effective way to vary zoom at lower gradients, such as 63 to 87%. In addition, gestures tend to have unique patterns identifiable by a sensor, such as a touchscreen or depth camera, and not necessarily to have precise inputs. For instance, human motor control limitations based upon end user hand size and flexibility limit the scope of gesture actions. With the pinch zoom example, a user generally has a fixed response for a one-handed pinch without an option to change the scale of an input, such as 100% zoom for a detected pinch versus 500% for that pinch. Instead, an end user often has to perform multiple sequential gestures to obtain a desired input or has to turn to more precise input techniques, such as a selection input through a keyboard and/or mouse.

SUMMARY OF THE INVENTION

Therefore, a need has arisen for a system and method which provides information handling system enhanced gesture management, control and detection.

In accordance with the present invention, a system and method are provided which substantially reduce the disadvantages and problems associated with previous methods and systems for accepting gestures as inputs at an information handling system. Gesture inputs at an information handling system selectively adapt a physical input device to change modes during the gesture so that inputs to the physical input device support the gesture with more precise granularity. For example, a rotational totem adapts from inputs of a first type to gesture inputs at detection of a gesture input so that rotating the totem adjusts the gesture input, and reverts back to inputs of the first type at removal of the gesture.

More specifically, an information handling system processes information with a processor and memory to present the information as a visual image at a display, such as a touchscreen display or a head mounted display. Sensors interfaced with the information handling system detect end user inputs as gestures that adjust the presentation of the visual image, such as pinching the visual image to zoom in or out, swiping to move the visual image, or rotating to change the orientation of the visual image. Upon detection of a gesture, a gesture engine executing on the information handling system adapts a physical input device, such as a rotational totem, from inputs of a first type to inputs associated with the gesture. While the gesture is maintained, inputs to the physical input device are applied in the same manner as the gesture, such as zooming, swiping or rotating the visual image, to provide the end user with more precision and granularity with the input. For example, a gesture to zoom in by pinching two fingers together zooms the visual image by 100% and adapts a rotating totem to input zoom adjustments at a fractional zoom. such as commanding 100% of zoom with a full 360 degrees of rotation of the totem. Once the end user completes the gesture, such as by removing the fingers from the pinched position, the physical input device reverts to the first type of input. Thus the gesture engine manages gesture inputs by combining end user gestures with physical device inputs with temporary changes to the physical device mode and/or functionality while the gesture is active.

The present invention provides a number of important technical advantages. One example of an important technical advantage is that gesture inputs automatically adapt a rotating totem or other physical input device to apply inputs as gesture inputs while a gesture is active. Adapting a physical input device to apply inputs as gesture inputs allows an end user to maintain continuity of a gesture through the physical input device without acting separately to re-configure inputs of the physical input device. The end user initiates an input through a gesture and then manipulates the physical input device to provide refined gesture inputs at a desired granularity. For example, an end user initiates a low resolution gesture input, such as a swipe on a color bar to select a color, and then performs a high resolution input by rotating a totem to increment between available colors in a more narrow range. The end user automatically has available different resolutions of inputs with a gesture input by temporarily switching the mode or functionality of an input device during an active gesture to support the gesture input with an alternative resolution. In various embodiments, various gestures are supported to adapt visual images on a touchscreen or virtual objects presented by a head mounted display so that convenient physical input devices that offer greater input precision adapt to perform the gesture input, such as in an immersed environment that includes depth camera, ultrasonic, gaze and other types of gesture input tracking.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Gesture inputs at an information handling system adapt a physical input device to inputs associated with the gesture while the gesture is active, the physical input device providing a different granularity and/or resolution to the end user of the information handling system for the gesture inputs. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
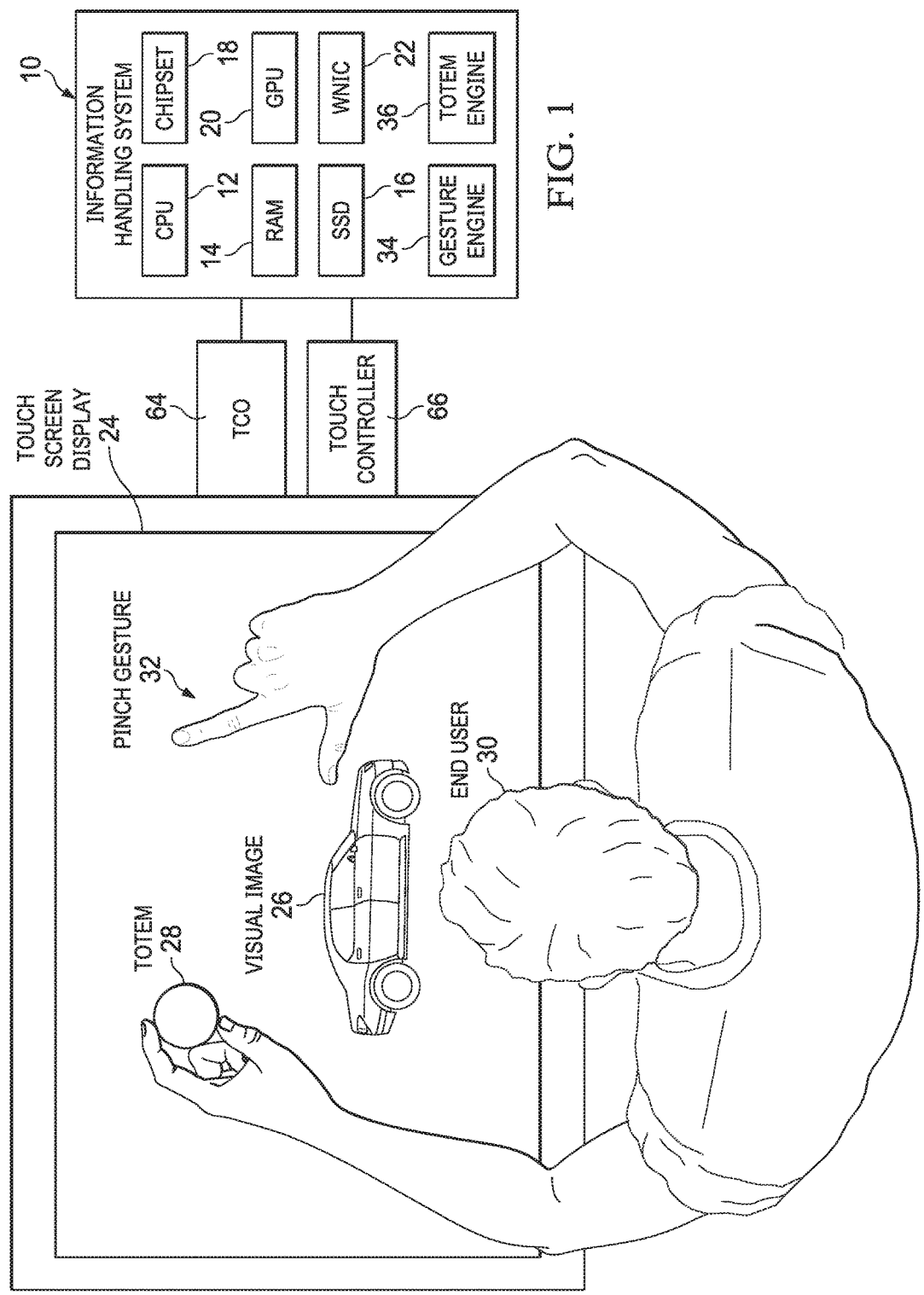
FIG. 1 depicts a block diagram depicts an information handling system configured to adapt a physical input device to adapt to an input associated with a gesture while the gesture is active.

Referring now to FIG. 1, a block diagram depicts an information handling system 10 configured to adapt a physical input device 28 to adapt to an input associated with a gesture while the gesture is active. In the example embodiment, information handling system 10 processes information with a central processing unit (CPU) 12 that executes instructions stored in random access memory (RAM) 14, such as instructions of an operating system and applications stored in solid state drive (SSD) 16 or other non-transient persistent storage device. A chipset 18 includes a variety of processing components and embedded code stored in non-transient flash memory to coordinate external device interactions with CPU 12, such as inputs and outputs by input/output (I/O) devices. A graphics processor unit (GPU) 18 processes visual information provided by CPU 12 to define a visual image for presentation at a display device, such as by defining pixel values that the display applies to generate the visual image. A wireless network interface card (WNIC) 22 supports communication with external devices, such as through a wide area network, local area network, and/or a direct communication protocol like Bluetooth. In the example embodiment, GPU 18 communicates pixel values to a timing controller 64, which scans the pixel values across touchscreen display 24 to generate a visual image 26 for presentation to an end user 30. End user 30 interacts with visual image 26 by touches to touchscreen display 24 that touch controller 66 detects and reports to CPU 12 through chipset 18. In addition, end user 30 interacts with visual image 26 through physical input device 28 depicted in the example embodiment as a rotational totem. For instance, rotating totem 28 translates rotational movement through capacitive feet on the bottom surface of totem 28 to touch controller 66 to command a scroll of visual information on display 24. Alternatively, totem 28 includes a sensor that detects rotation and a wireless interface that reports rotation to WNIC 22 to command scrolling of visual information.

In the example embodiment, end user 30 performs gesture inputs at touchscreen display 24 with predetermined finger or hand motions, such as a pinching movement with two fingers to command a zoom in or zoom out of visual image 26. The gesture is detected by touch controller 66 and reported through chipset 18 to CPU 12, such as through an operating system application programming interface (API) or driver. In the example embodiment, a gesture engine 34 includes instructions stored in flash memory to identify gestures, such as the pinch, and report the gestures to CPU 12, such as through the operating system. Once the gesture is recognized and evaluated, visual image 26 is adjusted by GPU 18 in response to the gesture. For instance, the amount of finger movement of the pinch detected by touch controller 66 is applied to determine an amount of zoom to change visual image 26, such as a change of 100% to double or halve the zoom.

In order to support more precise and granular inputs related to a gesture, when gesture engine 34 identifies a gesture, the gesture type is communicated to a totem engine 36 to switch the functionality of totem 28 to support the ongoing gesture until the gesture ends. For example, if totem 28 is configured to scroll visual image 26 in response to a rotational movement, detection of a pinch gesture re-configures inputs to totem 28 so that rotation of totem 28 instead commands zoom in or out, the same input as that of the pinch gesture. In one embodiment, totem 28 remains associated with the gesture input while end user 30 remains active in the gesture. For example, end user 30 maintains pinch gesture 32 on touchscreen display 24 for as long as end user 30 desires to fine tune the zoom level with inputs made through totem 28. Once end user 30 has completed inputs through totem 28, end user 30 removes pinch gesture 32 to revert totem 28 to the previous input type, such as scrolling. In one embodiment, while totem 28 is associated with gesture inputs, totem engine 36 coordinates presentation of a gesture input user interface at display 24 proximate totem 28 and haptic feedback at totem 28. For instance, while pinch gesture 32 is maintained by an end user, totem engine 36 presents a user interface at totem 28 indicating change in zoom at rotational orientations of totem 28 and initiates a click of haptic feedback for each percent change in zoom performed by an end user through rotation of totem 28. As another example, end user 30 swipes a color pallet to locate a color selection and then rotates totem 28 to narrow the color selection by incrementing through each color to find a desired color shade. The swipe gesture provides a large scale color selection and, then, while the end user holds the swipe gesture in place, totem 28 rotation provides precise color shade selection with an increment in color shade at each degree of rotation. Once the end user removes the swipe gesture, totem 28 returns to supporting its previous function, such as scrolling.

Advantageously, selective configuration of a physical input device, such as totem 28, to associate with a gesture input while the gesture input is active helps to match end user input precision to end user needs in a non-intrusive and intuitive manner. In an immersed environment, an end user may select gestures as an input method where the perceived cost or burden of a gesture is more efficient than other available inputs. In selecting an available input method, the end user also considers accuracy of the input and control for the desired task. For example, writing with a fingertip on a touchscreen is quick and simple but inaccurate compared to writing on the touchscreen with a pen. An end user may select to make short inputs with a finger while performing more complex inputs with a pen. As another example, a touchpad provides cursor movement control with reasonable precision and movement lag, however, a touchpad tends to have difficulty distinguishing pinch gestures for zoom control in a precise manner. Automated detection at a touchpad or touchscreen of a gesture to adapt a physical input device enhances end user interactions by enabling the end user to shift to a bi-manual input mode as needed, such as during fast-paced or intensive interactions or during precise input events. With input tasks that have lower cognitive loads and where precision is more important than response time, automatically and temporarily changing the control input of one hand to the same control as the other hand offers improved performance by eliminating the real or perceived burden of manually switching input modes. For instance, a precise optical sensor in a rotating totem and the fine motor control available when rotating a knob between an index finger and thumb provides an opportunity for fine precision unavailable from gesture detection while not burdening the end user with additional tasks associated with selecting an input mode.

Figure 2:
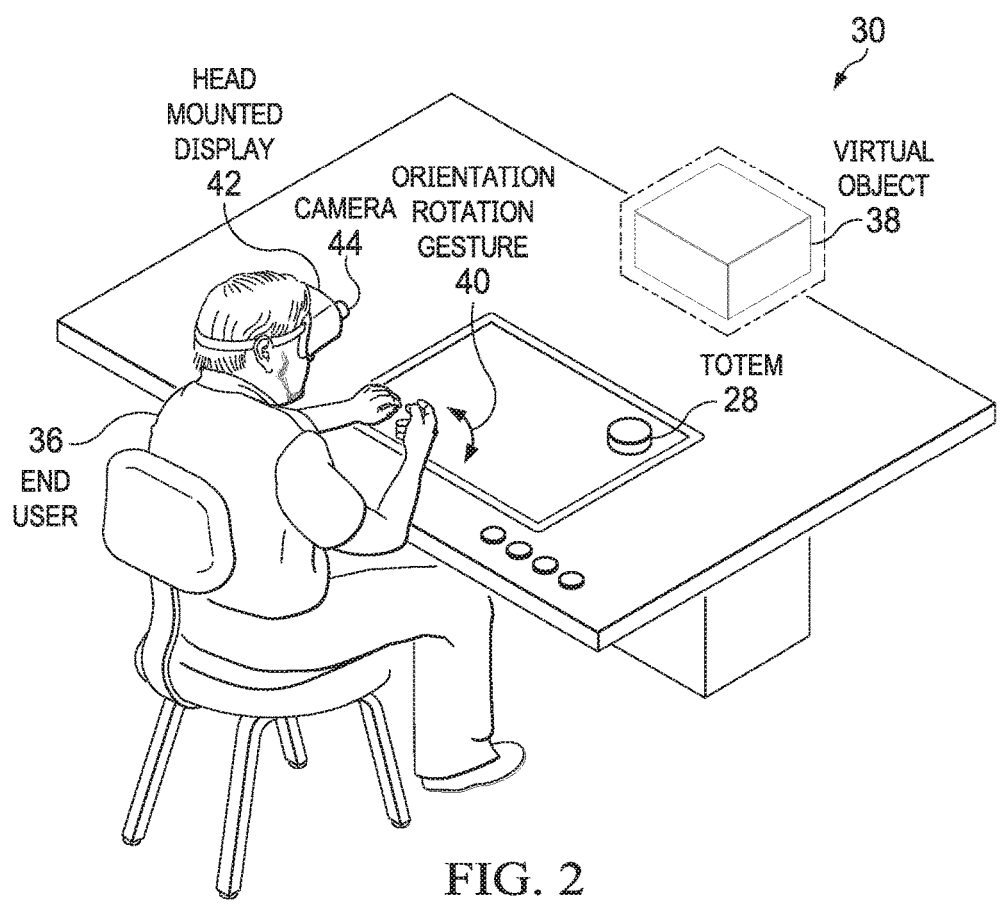
FIG. 2 depicts an example embodiment of an end user immersed in a virtual environment having a physical input device adapted to an input associated with a gesture while the gesture is active.

Referring now to FIG. 2, an example embodiment is depicted of an end user 30 immersed in a virtual environment having a physical input device 28 adapted to an input associated with a gesture while the gesture is active. End user 30 views a virtual object 38 presented through a head mounted display 42. For example, head mounted display 42 projects virtual object 38 in three dimensions to appear at a location in front of end user 30. End user 30 reaches out to perform an orientation rotation gesture at virtual object 38, such as grasping at the projection location and moving the end user's arm in the direction of desired rotation. A depth camera 44 detects the gesture and reports the gesture to an information handling system that generates the visual image in head mounted display 42 to rotate virtual object 38 about the axis indicated by the gesture. Upon initiation of the gesture, totem 28 is adapted from a first type of input to an input associated with the gesture. Once end user 30 has initiated the gesture, by maintaining the gesture with his hand in the raised position, the end user can make more precise orientation changes about the selected axis with rotation of totem 28. As an example, if the gesture rotated virtual object 38 by ninety degrees, totem rotation is applied at a fractional relationship to the gesture rotation, such as a 10 to 1 proportional relationship. When the end user completes the gesture by dropping his hand from the input location, totem 28 returns to its previous functionality. In the example embodiment, totem 28 provides more precision in orientation selection than a grasp by using a fractional relationship. In alternative embodiments an opposite relationship may exist in which totem 28 provides greater rotation. Further, the relationship of gesture input versus totem input may be input by a user as a setting or may use other types of factors, such as intuitive increments in defined use cases.

Figure 3:
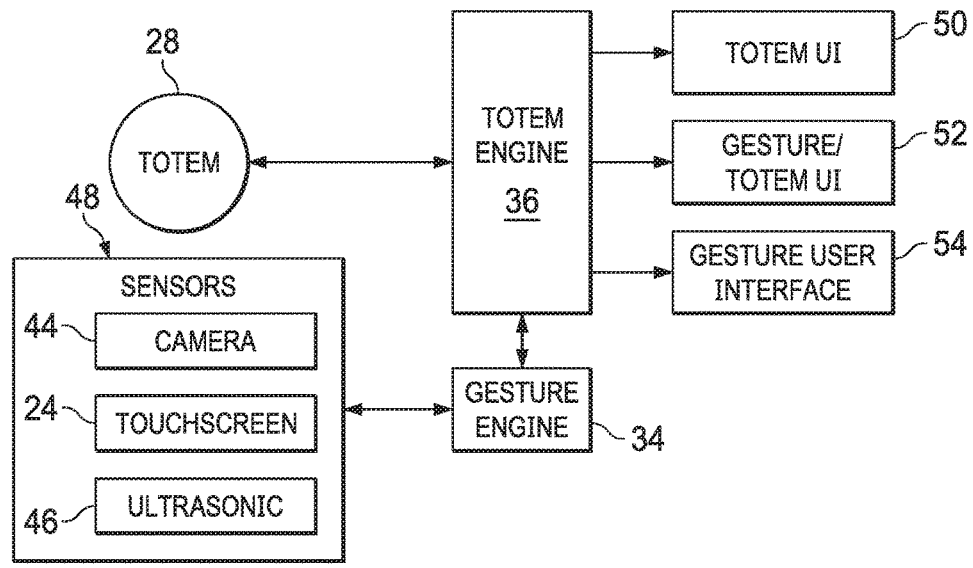
FIG. 3 depicts a block diagram depicts a system for managing gesture inputs through a totem at an information handling system.

Referring now to FIG. 3, a block diagram depicts a system for managing gesture inputs through a totem 28 at an information handling system. In the example embodiment, sensors 48 detect gestures and report the gestures to a gesture engine 34. In the example embodiment, sensors 48 include a depth camera 44, a touchscreen 24 and an ultrasonic sensor 46. At detection of a gesture, gesture engine 34 commands totem engine 36 to configure to temporarily accept gesture-type inputs instead of existing inputs. For instance, when a gesture is inactive totem 28 scrolls visual images at a display; and when a gesture is active, totem 28 performs the same input as the gesture. At detection of a gesture, totem engine 36 communicates with a gesture/totem user interface 52, such as through an operating system combined controller API, to adapt visual images presented to an end user, such as applying inputs at totem 28 as incremental gesture inputs. For example, if a zoom gesture is active, totem 28 inputs applied to gesture/totem user interface 52 increments zoom at a predetermined fractional relationship to the zoom. In addition, totem engine 36 communicates haptic and/or visual feedback for presentation in relation with totem 28, such as at a display on which totem 28 rests or through a Bluetooth interface that activates a vibration motor in totem 28. Upon completion of the gesture, gesture engine 34 communicates completion to totem engine 36 to revert totem 28 to its pre-existing input configuration. For example, after the end user removes pinched fingers from a touchscreen, totem engine 36 applies totem user interface 50 so that inputs at totem 28 return to a scroll functionality, such as through an operating system radial controller API. Gesture engine 34 then returns to apply gestures with a gesture user interface 54. For example, some gestures may initiate a change of totem 28 functionality while other gestures do not. Gesture engine 34 and totem engine 36 are, for example, software, firmware and/or hardware elements distributed across an information handling system that cooperate to manage end user gesture inputs.

In the example embodiments above, detection of a gesture re-configures a physical input device, such as a rotational totem 28, to have the same type of input as the gesture. In alternative embodiments, alternative types of configurations may be applied to physical device inputs. For example, in one alternative embodiment, totem 28 is re-configured to change the scale of a gesture input. For instance, if an end user pinches to zoom and sees a 100% zoom in, the end user may then turn totem 28 while the gesture is maintained to increase or decrease the amount of zoom applied for the gesture. For example, the end user may rotate totem 28 to reduce the scale of zoom so that on subsequent zoom gestures a 10% zoom is performed. As another example, the end user may rotate totem 28 to the right to increase the scale of zoom so that on subsequent zoom gestures a 1000% zoom is performed. After the gesture completes, the zoom gesture setting may return to the original configuration or remain set for application as subsequent gestures. As another example, totem 28 may provide rotational input as fine control for the gesture while translation of totem 28 may provide a related input, such as changing the scale of the object involved with the gesture. For instance, rotation may adjust shade of color as a fine input and translation up and down may provide a jump to a different color in the palette. As another example, an end user rotation of a virtual object about an axis re-configures totem 28 to change the rotational axis instead of the amount of rotation. After completion of the gesture, the physical input device reverts to its original functionality. In addition to a rotating totem, other types of input devices that change functionality may include a pen, a 3D Connection Space Mouse used for CAD applications that includes rotational inputs for find control and joystick sensors for directional input, etc. . . .

Figure 4:
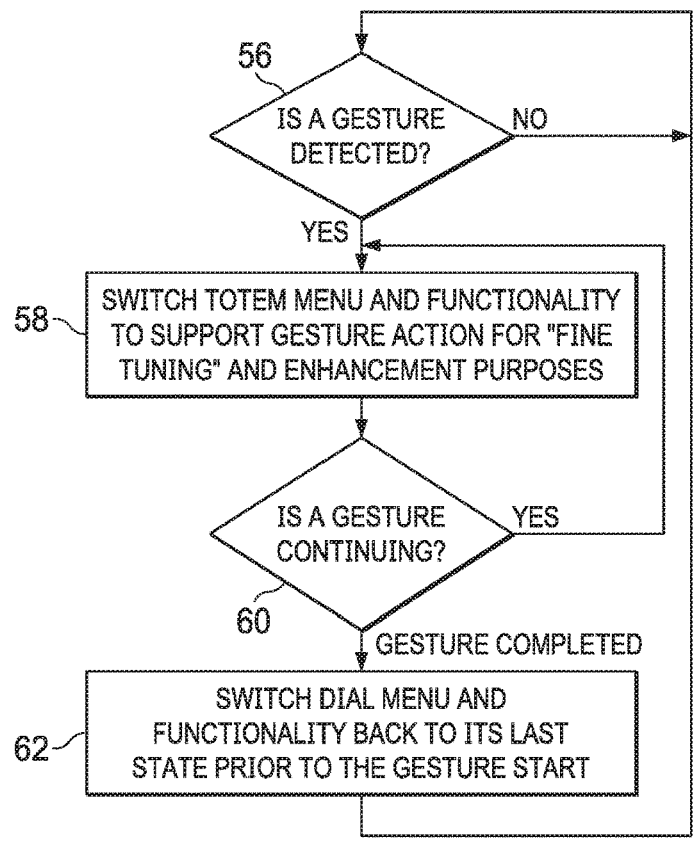
FIG. 4 depicts a flow diagram of a process for automatically adapting a physical input device to selectively associate with a first type of input or a gesture input.

Referring now to FIG. 4, a flow diagram depicts a process for automatically adapting a physical input device to selectively associate with a first type of input or a gesture input. The process starts at step 56 with a detection of a gesture at an information handling system. For example, a state machine interfaced with sensors of an information handling system monitor the environment at the information handling system until a gesture is detected. Upon detection of a gesture, the process continues to step 58 to switch a totem or other physical input device from an existing input state to perform an input associated with the gesture. For example, the totem menu and functionality are reconfigured while the gesture is active to support the gesture action, such as for fine tuning and enhancement of gesture inputs. As an example, a swipe on a color pallet finds a base color, such as red, and activates a totem to increment through shades of red when the totem rotates. At step 60, a determination is made of whether the gesture is continuing, such as whether the end user has maintained the gesture position for detection by a sensor. For instance, a gesture is maintained if the end user holds the gesture in the input position, such as pinched fingers staying in the pinched position or a swipe continuing to point at a menu. In one embodiment, once an end user starts to input at the physical input device, the physical input device will consider the gesture maintained while the end user contacts the physical input device. For instance, the end user might grab a totem while the end user's fingers are pinched and then maintain the totem in a zoom input mode until the end user releases the totem. Once the gesture is completed at step 60, the process continues to step 62 to re-configure the totem to its previous input state. For example, if the totem was in a scroll input mode at detection of the gesture, upon completion of the gesture the totem applies inputs as scroll inputs. At step 62, the totem input menu and functionality change from the gesture menu and functionality back to the original menu and functionality.

Although the present invention has been described in detail, it should be understood that various changes, substitutions and alterations can be made hereto without departing from the spirit and scope of the invention as defined by the appended claims.

What is claimed is:

1. An information handling system comprising:
a processor operable to execute instructions that process information;
a memory interfaced with the processor and operable to store the instructions and information;
a display interfaced with the processor and operable to present the information as visual images;
one or more sensors interfaced with the processor and display, the one or more sensors operable to detect movement of an end user proximate to the display;
a rotating input device interfaced with the processor and operable to accept end user inputs as rotational movement; and
a gesture engine interfaced with the one or more sensors and the rotating input device, the gesture engine operable to detect an end user motion defined as a gesture and, in response to the gesture, to re-assign inputs at the rotating input device from a first type to instead adjust an input associated with the gesture;
wherein the gesture engine is further operable to:
monitor the end user to detect maintenance of the gesture for a period of time;
assign inputs at the rotating input device as associated with the gesture during the period of time; and
re-assign inputs to the first type at the end of the period of time upon detecting the end user has stopped maintaining the gesture.

2. The information handling system of claim 1 wherein the rotating device input associated with the gesture changes the scale associated with the gesture movement.

3. The information handling system of claim 1 wherein the rotating device input associated with the gesture comprises a reduced scale input of the same type as the gesture input.

4. The information handling system of claim 3 wherein the gesture comprises a finger pinch that commands a change in zoom of a visual image presented at the display from a first zoom level to a second zoom level and the rotational device inputs comprise a change in zoom having a fractional gradient of change in zoom of the gesture.

5. The information handling system of claim 3 wherein the display comprises a horizontally disposed touchscreen display, the rotational input device comprises a totem disposed on the touchscreen device to perform inputs as touches at the touchscreen display, and the gesture comprises a multi-finger touch at the touchscreen display.

6. The information handling system of claim 3 wherein the display comprises a head mounted display, the one or more sensors comprise a depth camera and the gesture comprises a hand motion at a virtual object presented by the head mounted display.

7. The information handling system of claim 6 wherein the gesture further comprises a rotational movement indicating rotation of the virtual object about an axis, the rotating input device communicates a rotational input through a wireless interface, and the rotational input indicates fractional rotational movement of the virtual object about the axis.

8. The information handling system of claim 1 wherein the rotating input device first type of input is a scroll of information presented at the display.

9. A method for managing gesture inputs to an information handling system, the method comprising:
detecting a gesture input with one or more sensors of the information handling system;
adapting a visual image presented at a display of the information handling system according to the gesture;
detecting maintenance of the gesture input with the one or more sensors;
in response to the detecting maintenance of the gesture input, re-assigning an input device from a first type of input to a second type of input, the second type of input associated with the gesture and the adapting the visual image;
applying inputs at the input device to adapt the visual image according to a predetermined scale of the gesture;
detecting removal of the maintenance of the gesture input with the one or more sensors; and
in response to detecting removal, re-assigning the input device from the input associated with the gesture to the first type of input.

10. The method of claim 9 wherein:
the input device comprises a rotational device that determines inputs from a relative rotational position; and
the first type of input comprises scrolling content presented at the display.

11. The method of claim 9 wherein:
the display comprises a touchscreen display;
the gesture input comprises a pinching movement with two fingers at the touchscreen display to change the visual image zoom;
detecting maintenance comprises holding the two fingers in place on the touchscreen display; and applying inputs at the input device further comprises detecting rotation of a totem input device at the touchscreen display, the rotation applied to zoom the visual image a fractional amount of the zoom associated with the gesture.

12. The method of claim 9 wherein:
the display comprises a head mounted display that presents the visual image as a virtual object at a location;
the gesture input comprises a hand movement at the location that rotates the visual image;
detecting maintenance comprises the hand held at the location; and
applying inputs comprises detecting rotation of the input device, the rotation applied to rotate the virtual object a fractional amount of the rotation associated with the gesture.

13. The method of claim 9 wherein the applying inputs at the input device to adapt the visual image according to a predetermined scale of the gesture further comprises:
applying the inputs at the input device to change the scale of gestures by a predetermined amount.

14. The method of claim 9 wherein the applying inputs at the input device to adapt the visual image according to a predetermined scale of the gesture further comprises:
applying the inputs at the input device to change the visual image according to the gesture input.

15. A system for managing gesture inputs to an information handling system, the system comprising:
a display configured to present visual information;
one or more sensors configured to detect gestures as inputs that adjust the visual information;
a physical input device configured to accept end user inputs and apply the inputs as a first type; and
non-transient memory storing instructions that when executed on a processor:
detect a gesture maintained for a predetermined time;
in response to the maintained gesture, re-assign inputs at the physical input device from the first type to inputs associate with the gesture;
detect removal of the maintained gesture; and
in response to the detect removal of the maintained gesture, re-assign inputs at the physical input device to the first type.

16. The system of claim 15 wherein the re-assigned inputs adjust the visual information at a fraction of a gesture input.

17. The system of claim 15 wherein the re-assigned inputs calibrate the visual image adjusting by the gestures.

18. The system of claim 15 wherein the display comprises a touchscreen display, the physical input device comprises a totem that translates touches to the touchscreen display in response to end user movement, the gesture comprises a zoom of the visual image, and the totem inputs provide a fractional zoom input.

* * * * *